US012580198B2

(12) United States Patent
Chae et al.

(10) Patent No.: US 12,580,198 B2
(45) Date of Patent: Mar. 17, 2026

(54) NEGATIVE ELECTRODE FOR LITHIUM SECONDARY BATTERY, METHOD OF PRODUCING THE SAME AND LITHIUM SECONDARY BATTERY INCLUDING THE SAME

(71) Applicant: LG CHEM, LTD., Seoul (KR)

(72) Inventors: Oh Byong Chae, Daejeon (KR); Sang Wook Woo, Daejeon (KR); Je Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1551 days.

(21) Appl. No.: 16/981,830

(22) PCT Filed: Mar. 18, 2019

(86) PCT No.: PCT/KR2019/003144
    § 371 (c)(1),
    (2) Date: Sep. 17, 2020

(87) PCT Pub. No.: WO2019/198938
    PCT Pub. Date: Oct. 17, 2019

(65) Prior Publication Data
    US 2021/0043940 A1    Feb. 11, 2021

(30) Foreign Application Priority Data
    Apr. 11, 2018    (KR) ........................ 10-2018-0042226

(51) Int. Cl.
    *H01M 4/66*        (2006.01)
    *H01M 4/04*        (2006.01)
    (Continued)

(52) U.S. Cl.
    CPC ........... *H01M 4/66* (2013.01); *H01M 4/0435* (2013.01); *H01M 4/131* (2013.01); *H01M 4/133* (2013.01);
    (Continued)

(58) Field of Classification Search
    CPC ........ H01M 4/66; H01M 4/131; H01M 4/133; H01M 4/134; H01M 4/1395; H01M 4/386;
    (Continued)

(56) References Cited

U.S. PATENT DOCUMENTS 6,001,139 A * 12/1999 Asanuma .............. H01M 4/139
                                                    429/231.95
6,761,744 B1 * 7/2004 Tsukamoto ............. H01M 4/13
                                                    429/231.95
(Continued)

FOREIGN PATENT DOCUMENTS

CN        101069310 A    11/2007
CN        101346837 A    1/2009
(Continued)

OTHER PUBLICATIONS

International Search Report (PCT/ISA/210) issued in PCT/KR2019/003144 mailed on Jun. 24, 2019.
(Continued)

*Primary Examiner* — Stephen J Yanchuk
(74) *Attorney, Agent, or Firm* — Birch, Stewart, Kolasch & Birch, LLP

(57) ABSTRACT

A negative electrode for a lithium secondary battery, a method of producing the negative electrode, and a lithium secondary battery including the negative electrode. Specifically, the negative electrode can reduce the initial irreversibility of the negative electrode because lithium metal ions are diffused into the negative electrode active material layer
(Continued)

by pre-lithiation, and the negative electrode active material layer into which the lithium metal ions are diffused includes a plurality of line-shaped concave portions, so that when the lithium secondary battery is produced later, the concave portion keeps an electrolyte solution therein well to improve the impregnability of the electrolyte solution, thereby ultimately improving the electrochemical performance of the lithium secondary battery.

7 Claims, 2 Drawing Sheets

(51) Int. Cl.

| | |
|---|---|
| *H01M 4/131* | (2010.01) |
| *H01M 4/133* | (2010.01) |
| *H01M 4/134* | (2010.01) |
| *H01M 4/1395* | (2010.01) |
| *H01M 4/36* | (2006.01) |
| *H01M 4/38* | (2006.01) |
| *H01M 10/0525* | (2010.01) |
| *H01M 4/02* | (2006.01) |

(52) U.S. Cl.
CPC ......... *H01M 4/134* (2013.01); *H01M 4/1395* (2013.01); *H01M 4/366* (2013.01); *H01M 4/386* (2013.01); *H01M 10/0525* (2013.01); *H01M 2004/027* (2013.01)

(58) Field of Classification Search
CPC ...... H01M 4/1393; H01M 4/387; H01M 4/13; H01M 4/0435; H01M 4/366; H01M 4/043; H01M 4/0459; H01M 4/587; H01M 4/382; H01M 4/628; H01M 4/364; H01M 4/0404
See application file for complete search history.

(56) References Cited

U.S. PATENT DOCUMENTS

| | | | |
|---|---|---|---|
| 2006/0130043 A1 | 6/2006 | Park et al. | |
| 2007/0218365 A1 | 9/2007 | Takezawa et al. | |
| 2009/0170001 A1 | 7/2009 | Roozeboom et al. | |
| 2009/0302419 A1 | 12/2009 | Kemmeren et al. | |
| 2010/0151329 A1 | 6/2010 | Sato et al. | |
| 2013/0003261 A1 | 1/2013 | Remizov et al. | |
| 2014/0050977 A1 | 2/2014 | Sanada et al. | |
| 2016/0013462 A1* | 1/2016 | Cui ....................... | H01M 4/666 |
| | | | 429/126 |
| 2017/0062815 A1 | 3/2017 | Zhong | |
| 2019/0013516 A1* | 1/2019 | Herle ...................... | C23C 14/14 |
| 2019/0319255 A1* | 10/2019 | Youn ..................... | H01M 4/382 |

FOREIGN PATENT DOCUMENTS

| | | | |
|---|---|---|---|
| CN | 101038962 A | 1/2026 | |
| JP | 10-289708 A | 10/1998 | |
| JP | 2004-158441 A | 6/2004 | |
| JP | 2007-500922 A | 1/2007 | |
| JP | 2007-157704 A | 6/2007 | |
| JP | 2009-205903 A | 9/2009 | |
| JP | 2011-18585 A | 1/2011 | |
| JP | 2013-20974 A | 1/2013 | |
| JP | 2014-146475 A | 1/2026 | |
| KR | 10-2008-0053920 A | 6/2008 | |
| KR | 10-1162794 B1 | 7/2012 | |
| KR | 10-2013-0007320 A | 1/2013 | |
| KR | 10-2014-0024207 A | 2/2014 | |
| KR | 10-2016-0037488 A | 4/2016 | |

OTHER PUBLICATIONS

European Patent Office Search Reporting dated Mar. 31, 2021 for EP Application No. 19784734.6.

* cited by examiner

【FIG.1】
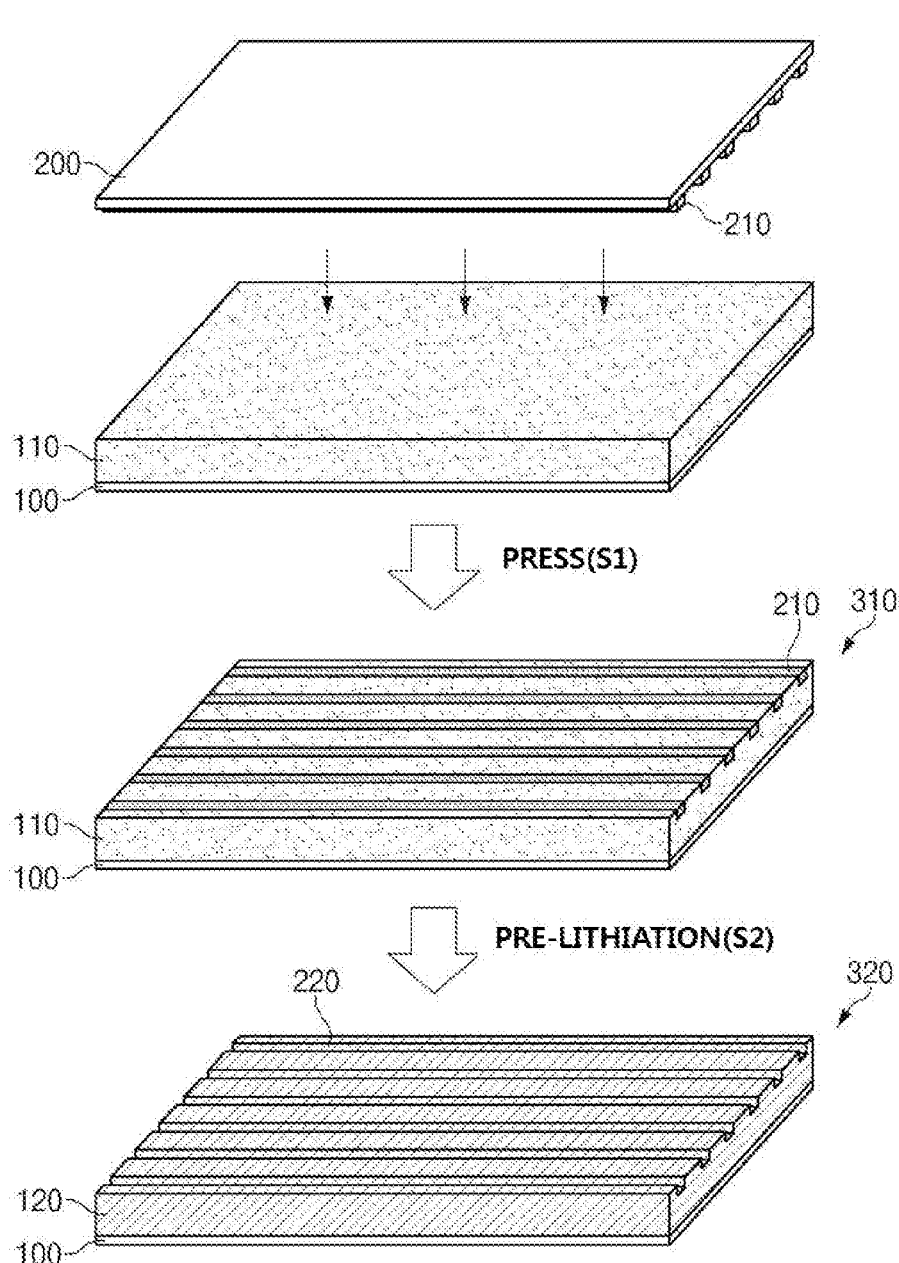

【FIG.2】
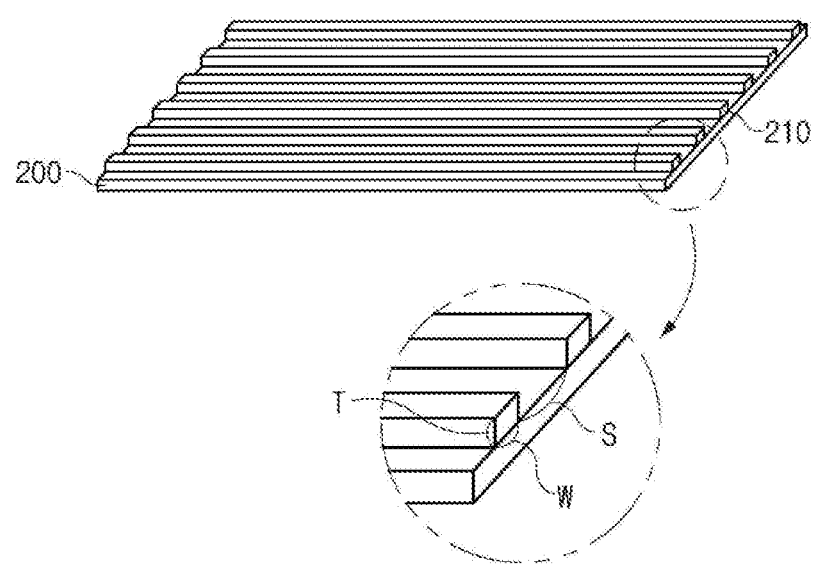

NEGATIVE ELECTRODE FOR LITHIUM SECONDARY BATTERY, METHOD OF PRODUCING THE SAME AND LITHIUM SECONDARY BATTERY INCLUDING THE SAME

CROSS-REFERENCE TO RELATED APPLICATION

This application claims priority to and the benefit of Korean Patent Application No. 10-2018-0042226 filed in the Korean Intellectual Property Office on Apr. 11, 2018, the entire contents of which are incorporated herein by reference.

Technical Field

The present invention relates to a negative electrode for a lithium secondary battery, a method of producing the negative electrode, a method of producing a pre-lithiated negative electrode by pre-lithiation of the negative electrode, and a lithium secondary battery including the negative electrode. Specifically, the present invention relates to a negative electrode for a lithium secondary battery which secures the initial reversibility of a negative electrode and increases impregnability of an electrolyte solution to improve electrochemical performance of a lithium secondary battery, a method of producing the negative electrode and a lithium secondary battery including the negative electrode.

Background Art

As technology development and demand for mobile devices increase, there is a rapid increase in demand for secondary batteries as energy sources. Among such secondary batteries, lithium secondary batteries, which exhibit high energy density and operating potential, a long cycle life and a low self-discharge rate, have been commercialized and widely used.

Meanwhile, a metal oxide such as $LiCoO_2$, $LiMnO_2$, $LiMn_2O_4$ or $LiCrO_2$ is used as a positive electrode active material forming a positive electrode of the lithium secondary battery, and lithium metal, a carbon-based material such as graphite, activated carbon or the like, a material such as silicon oxide ($SiO_x$) or the like is used as a negative electrode active material forming a negative electrode. Among the above-mentioned negative electrode active materials, lithium metal was mainly used in the beginning, but as charging and discharging cycles progress, lithium atoms are grown on the surface of the lithium metal, resulting in damage to a separator and a battery, and thus carbon-based materials have been mainly used recently. However, in the case of carbon-based materials, since a theoretical capacity is only about 400 mAh/g, there is a disadvantage of small capacity. Thus, various studies have been made to replace the carbon-based material with a silicon (Si)-based material having a high theoretical capacity (4,200 mAh/g) as a negative electrode active material.

The lithium secondary battery is charged and discharged while lithium ions of a positive electrode active material of a positive electrode are intercalated into/deintercalated from a negative electrode active material of a negative electrode.

Theoretically, lithium intercalation and deintercalation reactions into and from the negative electrode active material are completely reversible, but actually more lithium is consumed than the theoretical capacity of the negative electrode active material, and only a part of the lithium is recovered during discharge. Therefore, after the second cycle, a smaller amount of lithium ions is intercalated during charging, but almost all the intercalated lithium ions are deintercalated during discharging. The difference in capacity exhibited in the first charging and discharging reactions is referred to as irreversible capacity loss. Since commercialized lithium secondary batteries are manufactured in a state in which lithium ions are supplied from the positive electrode and lithium is not present in the negative electrode, it is important to minimize irreversible capacity loss in initial charging and discharging.

This initial irreversible capacity loss is known to be caused mainly by an electrolyte decomposition reaction on the surface of the negative electrode active material, and a solid electrolyte interface (SEI) is formed on the surface of the negative electrode active material by an electrochemical reaction through electrolyte decomposition. The formation of the SEI has a problem of causing irreversible capacity loss because a lot of lithium ions are consumed therefor, but the SEI formed at the beginning of charging prevents the reaction of lithium ions with the negative electrode or other materials during charging and discharging, and serves as an ion tunnel to pass only lithium ions, thereby further curbing a decomposition reaction of an electrolyte and contributing to the improvement of cycle characteristics of lithium secondary batteries.

Therefore, there is a need for a method for improving the initial irreversible capacity loss caused by the formation of the SEI and the like. One of the methods is to perform pre-lithiation before manufacturing the lithium secondary battery so that side reactions that occur during first charging are experienced in advance. As described above, in the case in which pre-lithiation is performed, when charging and discharging is performed on an actually manufactured secondary battery, there is an advantage that the initial irreversible capacity loss can be reduced because the first cycle proceeds in a state in which irreversible capacity loss is reduced.

Examples of the conventional pre-lithiation method include a method of depositing lithium on the negative electrode and a method of directly contacting the lithium with the negative electrode. However, there are disadvantages that it is expensive to set the apparatus for deposition to deposit lithium on a negative electrode, and workability is poor due to time consumption in mass production. Further, the method of directly contacting the negative electrode with lithium requires a process of immersing the negative electrode in an electrolyte solution for wetting before contacting the lithium, and thus it takes time and the electrode immersed in the electrolyte solution has a problem in adhesion.

Accordingly, there is a demand for development of a new negative electrode for a lithium secondary battery capable of achieving more effective pre-lithiation.

RELATED ART

Patent Document

JP2007-157704 A

DISCLOSURE

Technical Problem

An object of the present invention is directed to providing a negative electrode for a lithium secondary battery which secures the initial reversibility of the negative electrode and increase impregnability of an electrolyte solution to improve electrochemical performance of a lithium secondary battery, a method of effectively producing the negative electrode and a lithium secondary battery including the negative electrode.

Technical Solution

In order to achieve the object, first, the present invention provides a negative electrode for a lithium secondary battery which includes: a negative electrode current collector; and a negative electrode active material layer on a surface of the negative electrode current collector, wherein lithium metal ions are diffused into the negative electrode active material layer, and the negative electrode active material layer into which the lithium metal ions are diffused includes a plurality of line-shaped concave portions.

Here, the line-shaped concave portion may have a depth:width:interval ratio of 0.008 to 0.08:1.5 to 5.5:1.5 to 7.5.

The negative electrode active material layer may include one or more negative electrode active material selected from the group consisting of (a) a carbon-based material; (b) one or more selected from the group consisting of Si, Sn, Al, Sb, Sb, Zn, and oxides thereof; and (c) metal oxides selected from the group consisting of $Co_{x1}O_{y1}$ ($1 \leq x1 \leq 3$, $1 \leq y1 \leq 4$), $Ni_{x2}O_{y2}$ ($1 \leq x2 \leq 3$, $1 \leq y2 \leq 4$) $Fe_{x3}O_{y3}$ ($1 \leq x3 \leq 3$, $1 \leq y3 \leq 4$), $TiO_2$, $MoO_2$, $V_2O_5$ and $Li_4Ti_5O_{12}$, and specifically, may be a silicon-based negative electrode active material.

Further, the present invention provides a method of producing a negative electrode for a lithium secondary battery, including: (a) applying a negative electrode active material layer on a surface of a negative electrode current collector; (b) forming a lithium metal pattern on a surface of a polymer release film; (c) disposing the lithium metal pattern on the negative electrode active material layer so that the lithium metal pattern formed on the polymer release film is in contact with the negative electrode active material layer; (d) pressing the result of (c); (e) removing the polymer release film from the result of (d) to produce a negative electrode loaded with a lithium metal pattern; and (f) pre-lithiating the negative electrode by impregnating the negative electrode loaded with the lithium metal pattern with a pre-lithiation solution.

Here, the lithium metal pattern may be a line-and-space pattern, and the line-and-space pattern may have a pattern height:width:interval ratio of 0.01 to 0.1:1 to 5:2 to 8.

The pressing may be performed by roll pressing at a linear pressure of 1 kN/cm to 10 kN/cm.

The lithium in the lithium metal layer may be ionized through pre-lithiation and diffused into the negative electrode active material layer, and in the pre-lithiated negative electrode, lithium metal may be ionized through pre-lithiation and diffused into the negative electrode active material layer, thereby a line-shaped concave portion is formed at a place from which the lithium metal pattern was prior to being ionized and diffused.

Furthermore, the pre-lithiation solution contains an ionizable lithium salt and an organic solvent.

Further, the present invention provides a lithium secondary battery including the negative electrode for a lithium secondary battery.

Advantageous Effects

In the negative electrode of the present invention, since lithium metal ions are diffused into a negative electrode active material layer by pre-lithiation and the negative electrode active material layer includes a plurality of line-shaped concave portions, initial reversibility of the negative electrode can be ensured, and impregnability of an electrolyte solution can be enhanced to improve electrochemical performance of a lithium secondary battery.

DESCRIPTION OF DRAWINGS

FIG. 1 is a schematic view showing a process of producing the pre-lithiated negative electrode for a lithium secondary battery of the present invention.

FIG. 2 is a simplified view showing that a lithium metal pattern is formed on a polymer release film.

MODES OF THE INVENTION

Hereinafter, the present invention will be described in further detail.

Terminology used in the specification and claims should not be construed as limited to conventional or literal meanings, and should be construed as having meanings and concepts corresponding to the technical idea of the present invention based on the principle in which the inventor can suitably define the concept of a term to explain his own invention by the most preferable method.

Negative Electrode

The negative electrode of the present invention is a negative electrode for a lithium secondary battery, which includes: a negative electrode current collector; and a negative electrode active material layer formed on the negative electrode current collector, wherein lithium metal ions are diffused into the negative electrode active material layer, and the negative electrode active material layer into which the lithium metal ions are diffused includes a plurality of line-shaped concave portions.

In the negative electrode for a lithium secondary battery of the present invention, a negative electrode active material layer 120 into which lithium metal ions are diffused is formed on a negative electrode current collector 100, and the negative electrode active material layer 120 includes a plurality of line-shaped concave portions (electrode valleys) 220 (see FIG. 1).

The line-shaped concave portion may have a depth:width:interval ratio of 0.008 to 0.08:1.5 to 5.5:1.5 to 7.5, and for example, may have a depth of 8 μm to 80 μm and a width of 1.5 mm to 5.5 mm, and may be formed at an interval of 1.5 mm to 7.5 mm.

The depth, width, and interval of the concave portions are not necessarily within the above-described range, but when they are within the above-described range, suitable impregnability of an electrolyte solution can be maintained.

Although the depth, width, and interval of the concave portions are respectively affected by the height, width, and interval of the lithium metal pattern used to produce the negative electrode, there is a high likelihood that the concave portions will not be formed with the height, width, and interval of the lithium metal pattern. For example, when the lithium metal pattern is pressed, the lithium metal may become soft, and thus the pattern may spread to have a width that is wider than the original width; therefore, the width of the formed concave portion may be wider than the original width of the pattern and the depth of the concave portion may be smaller than the original height of the pattern.

The negative electrode active material included in the negative electrode active material layer may be a carbon-based material; one or more selected from the group consisting of Si, Sn, Al, Sb, Zn, and oxides thereof; and metal oxides selected from the group consisting of $Co_{x1}O_{y1}$ ($1 \le x1 \le 3$, $1 \le y1 \le 4$), $Ni_{x2}O_{y2}$ ($1 \le x2 \le 3$, $1 \le y2 \le 4$), $Fe_{x3}O_{y3}$ ($1 \le x3 \le 3$, $1 \le y3 \le 4$), $TiO_2$, $MoO_2$, $V_2O_5$ and $Li_4Ti_5O_{12}$.

Specifically, the negative electrode active material as a silicon-based negative electrode active material includes silicon (Si), a silicon-based alloy, silicon oxide ($SiO_x$, $0 < x \le 2$) or the like.

Further, the negative electrode active material layer may further include a carbon-based negative electrode active material such as artificial graphite, natural graphite, graphitized carbon fiber, and amorphous carbon in addition to the silicon-based negative electrode active material. In this case, the negative electrode active material layer may include a carbon-based negative electrode active material and a silicon-based negative electrode active material in a weight ratio of 99:1 to 50:50, and preferably 95:5 to 80:20.

When the silicon-based negative electrode active material is contained in the range below the above-described range, it is difficult to increase the energy density of the battery, and thus it is difficult to achieve high capacity of the battery. When the amount of the silicon-based negative electrode active material exceeds the above-described range, the degree of volume expansion of the negative electrode can be increased.

Method of Producing Negative Electrode

A method of producing a negative electrode for a lithium secondary battery according to the present invention includes the following steps (see FIG. 1):

applying a negative electrode active material layer 110 on a negative electrode current collector 100;

forming a lithium metal pattern 210 on a polymer release film 200;

disposing the lithium metal pattern 210 on the negative electrode active material layer 110 so that the lithium metal pattern 210 formed on the polymer release film 200 is in contact with the negative electrode active material layer 110;

pressing a resultant (S1);

removing the polymer release film 200 from the resultant to produce a negative electrode 310 loaded with the lithium metal pattern 210; and preparing a pre-lithiated negative electrode 320 by impregnating the negative electrode 310 loaded with the lithium metal pattern with a pre-lithiation solution (S2).

The negative electrode active material layer 110 before the lithium metal pattern is loaded may be formed by dissolving or dispersing the first negative electrode active material, a conductive material and/or a binder in a solvent to prepare a negative electrode composite material, applying the negative electrode composite material onto at least one surface of the negative electrode current collector, and drying and pressing the negative electrode composite material, or may be formed by casting the negative electrode composite material on a separate support and laminating a film separated from the support on the negative electrode current collector.

The negative electrode current collector is not particularly limited as long as it has high conductivity without causing chemical changes in the battery. For example, copper, stainless steel, aluminum, nickel, titanium, calcined carbon, copper or stainless steel which is surface-treated with carbon, nickel, titanium, silver or the like, an aluminum-cadmium alloy, or the like may be used. Further, the negative electrode current collector may generally have a thickness of 3 μm to 500 μm, and fine irregularities may be formed on the current collector surface to enhance the binding force of the negative electrode active material. For example, the negative electrode current collector may be used in various forms such as a film, a sheet, a foil, a net, a porous body, a foam, a nonwoven fabric, etc.

The negative electrode active material may be contained in an amount of 80 to 99 wt %, and more particularly, in an amount of 85 to 98 wt % based on the total weight of the negative electrode active material layer. When the content is in the above-described range, excellent capacity characteristics can be exhibited.

The conductive material is used for imparting conductivity to an electrode, and is not particularly limited as long as it has electronic conductivity without causing chemical changes in the corresponding battery. Specific examples thereof may include graphite such as natural graphite or artificial graphite; carbonaceous materials such as carbon black, acetylene black, Ketjen black, channel black, furnace black, lamp black, thermal black or carbon fiber; powders or fibers of metals such as copper, nickel, aluminum, and silver; conductive whiskers such as zinc oxide or potassium titanate; conductive metal oxides such as titanium oxide; conductive polymers such as polyphenylene derivatives and the like, and any one or a mixture of two or more thereof may be used. The conductive material may be included in an amount of 1 wt % to 30 wt % based on the total weight of the negative electrode active material layer.

Further, the binder serves to enhance the cohesion between the negative electrode active material particles and the binding force between the negative electrode active material and the current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinyl pyrrolidone, polytetrafluoroethylene, polyethylene, polypropylene, an ethylene propylene diene polymer (EPDM), a sulfonated EPDM, a styrene butadiene rubber (SBR), a fluororubber, various copolymers thereof and the like and any one or a mixture of two or more thereof may be used. The binder may be included in an amount of 1 wt % to 30 wt % based on the total weight of the negative electrode active material layer.

Meanwhile, the solvent used in the preparation of the negative electrode composite material may be a solvent commonly used in the related field. For example, dimethyl sulfoxide (DMSO), isopropyl alcohol, N-methylpyrrolidone (NMP), acetone, water or the like may be used alone or in combination. The amount of the solvent to be used may be suitably adjusted in consideration of application thickness of a slurry, production yield, viscosity, etc.

Meanwhile, a lithium metal pattern 210 formed on the polymer release film 200 may be a line-and-space pattern, and the line-and-space pattern may have a pattern height T:width W:interval S ratio of 0.01 to 0.1:1 to 5:2 to 8, and for example, may have a height T of 10 μm to 100 μm and a width W of 1 mm to 5 mm, and may be formed at an interval S of 2 mm to 8 mm (see FIGS. 1 and 2).

The pressing may be performed by roll pressing at a linear pressure of 1 kN/cm to 10 kN/cm, preferably, at a linear pressure of 1 kN/cm to 7 kN/cm. When the linear pressure is less than 1 kN/cm, the lithium metal may not be properly pressed against the negative electrode so that the concave portions may not be formed well. When the linear pressure is more than 10 kN/cm, the negative electrode may be pressed too hard, and thus the electrode may be damaged.

Lithium of the lithium metal pattern 210 is ionized through pre-lithiation and diffused into the negative electrode active material layer. In a process in which the negative electrode 310 loaded with the lithium metal is pre-lithiated, the lithium metal 210 is ionized and diffused into the negative electrode active material layer, and the disappearance of lithium metal from where there once was the lithium metal pattern 210 leaves a line-shaped concave portion 220.

The pre-lithiation solution is a solution containing an ionizable lithium salt and an organic solvent. The negative electrode may be pre-lithiated by being impregnated with the pre-lithiation solution before assembling an electrode assembly, or may be pre-lithiated by an electrolyte solution (corresponding to the pre-lithiation solution) injected after assembling a battery.

The pre-lithiation may be performed by impregnating the negative electrode on which a lithium metal is loaded with a pre-lithiation solution at a temperature in a range of 10° C. to 200° C. for 2 hours to 48 hours, preferably, at a temperature in a range of 20° C. to 70° C. for 13 hours to 36 hours.

When the pre-lithiation temperature and time are less than 10° C. and less than 2 hours respectively, pre-lithiation may not be sufficiently achieved. When the pre-lithiation temperature exceeds 200° C., lithium metal may melt and the shape thereof may not be maintained. Since the pre-lithiation is sufficiently achieved in 48 hours, there is no need to further impregnate the negative electrode.

The ionizable lithium salt contains $Li^+$ as a cation, and an anion may be selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_2C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$ and $(CF_3CF_2SO_2)_2N^-$.

The organic solvent may be one or more selected from the group consisting of a cyclic carbonate-based organic solvent selected from the group consisting of ethylene carbonate, 1,2-butylene carbonate, 2,3-butylene carbonate, 1,2-pentylene carbonate, 2,3-pentylene carbonate, vinylene carbonate and fluoroethylene carbonate (FEC); a linear carbonate-based organic solvent selected from the group consisting of dimethyl carbonate, diethyl carbonate, dipropyl carbonate, ethyl methyl carbonate, methyl propyl carbonate and ethyl propyl carbonate; a linear ester-based organic solvent selected from the group consisting of methyl acetate, ethyl acetate, propyl acetate, methyl propionate, ethyl propionate, propyl propionate and butyl propionate.

Lithium Secondary Battery

Next, a lithium secondary battery according to the present invention will be described.

The negative electrode produced according to the present invention may be usefully used for the production of lithium secondary batteries.

Specifically, the lithium secondary battery according to the present invention includes a negative electrode, a positive electrode positioned opposite to the negative electrode, a separator interposed between the negative electrode and the positive electrode and an electrolyte. Here, the negative electrode is a pre-lithiated negative electrode produced according to the present invention as described above.

Meanwhile, the secondary battery may optionally further include a battery container accommodating the electrode assembly of a positive electrode, a negative electrode, and a separator, and a sealing member sealing the battery container.

The lithium secondary battery may be produced according to a conventional secondary battery production method except that the negative electrode according to the present invention is used.

In the secondary battery, the positive electrode includes a positive electrode current collector and a positive electrode active material layer disposed on at least one surface of the positive electrode current collector.

The positive electrode may be produced according to a conventional positive electrode production method commonly known in the related field. For example, the positive electrode may be produced by dissolving or dispersing components forming the positive electrode active material layer, that is, a positive electrode active material, a conductive material and/or a binder in a solvent to prepare a positive electrode composite material, and applying the positive electrode composite material onto at least one surface of the positive electrode current collector and drying and pressing the positive electrode composite material, or may be produced by casting the positive electrode composite material on a separate support and then laminating a film separated from the support on the positive electrode current collector.

The positive electrode current collector is not particularly limited as long as it has conductivity without causing chemical changes in the battery. For example, stainless steel, aluminum, nickel, titanium, calcined carbon or aluminum or stainless steel which is surface-treated with carbon, nickel, titanium, silver or the like may be used. Further, the positive electrode current collector may generally have a thickness of 3 μm to 500 μm, and fine irregularities may be formed on the current collector surface to enhance the binding force of the positive electrode active material. For example, the positive electrode current collector may be used in various forms such as a film, a sheet, a foil, a net, a porous body, a foam, a nonwoven fabric, etc.

Examples of the positive electrode active material may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ (where y is 0 to 0.33), $LiMnO_3$, $LiMn_2O_3$, $LiMnO_2$ and the like; lithium copper oxide ($Li_2CuO_2$); vanadium oxides such as $LiV_3O_8$, $LiFe_3O_4$, $V_2O_5$, $Cu_2V_2O_7$ and the like; Ni-site type lithium nickel oxides of Formula $LiNi_{1-y}M_yO_2$ (where M=Co, Mn, Al, Cu, Fe, Mg, B, or Ga, and y=0.01 to 0.3); lithium manganese composite oxides of Formula $LiMn_{2-y}M_yO_2$ (where M=Co, Ni, Fe, Cr, Zn, or Ta, and y=0.01 to 0.1), or Formula $Li_2Mn_3MO_8$ (where M=Fe, Co, Ni, Cu, or Zn); $LiMn_2O_4$ wherein a portion of Li is substituted with alkaline earth metal ions; disulfide compounds; $Fe_2(MoO_4)_3$, etc.

Further, the binder and the conductive material may be the same as those described above for the negative electrode.

Meanwhile, in the secondary battery, the separator separates the negative electrode and the positive electrode and provides a path for migration of lithium ions. The separator may be used without any particular limitation as long as it is commonly used as a separator in the secondary battery. In particular, a separator having low resistance against the ion movement of an electrolyte and excellent impregnation of an electrolyte is preferred. Specifically, porous polymer films such as porous polymer films formed of polyolefin-based polymers such as ethylene homopolymers, propylene homopolymers, ethylene/butene copolymers, ethylene/hexene copolymers, ethylene/methacrylate copolymers and the like or a laminated structure having two or more layers thereof may be used. Further, a nonwoven fabric formed of a conventional porous nonwoven fabric, for example, glass fiber with a high melting point, polyethylene terephthalate fiber or the like may be used. Further, a coated separator containing a ceramic component or a polymer material to secure heat resistance or mechanical strength may be used, and may be optionally used as a single layer or a multilayer structure.

Meanwhile, examples of the electrolyte include an organic liquid electrolyte, an inorganic liquid electrolyte, a solid polymer electrolyte, a gel-type polymer electrolyte, a solid inorganic electrolyte, a molten-type inorganic electrolyte and the like which are usable in the production of the secondary battery, but are not limited thereto.

Specifically, the electrolyte may include an organic solvent and a lithium salt.

The organic solvent may be used without limitation as long as it may act as a medium which enables the movement of ions involved in the electrochemical reactions of a battery. Specifically, the organic solvent may be an ester-based solvent such as methyl acetate, ethyl acetate, γ-butyrolactone, ε-caprolactone and the like; an ether-based solvent such as dibutyl ether, tetrahydrofuran or the like; a ketone-based solvent such as cyclohexanone; an aromatic hydrocarbon-based solvent such as benzene, fluorobenzene and the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) and the like; an alcohol-based solvent such as ethyl alcohol, isopropyl alcohol and the like; nitriles such as Ra—CN (wherein Ra is a linear, branched or cyclic C2 to C20 hydrocarbon and may include a double-bonded aromatic ring or an ether bond); amides such as dimethylformamide; dioxolanes such as 1,3-dioxolane; or sulfolanes, etc. Among them, a carbonate-based solvent is preferred, and a mixture of a cyclic carbonate having high ionic conductivity and a high dielectric constant, such as ethylene carbonate or propylene carbonate, which can increase the charge and discharge performance of the battery, and a linear carbonate-based compound with low viscosity (for example, ethyl methyl carbonate, dimethyl carbonate, diethyl carbonate, etc.) is more preferred. In this case, when the cyclic carbonate and the chain-type carbonate are mixed in a volume ratio of about 1:1 to 9, the performance of the electrolyte may be excellent.

The lithium salt may be used without particular limitation as long as it is a compound capable of providing lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$, etc. The concentration of the lithium salt is preferably within the range of 0.1M to 2.0M. When the concentration of the lithium salt is within the above-described range, the electrolyte has suitable conductivity and viscosity, so that it may exhibit excellent electrolyte performance and the lithium ion may effectively move.

In addition to the above-described electrolyte components, one or more types of additives such as a haloalkylene carbonate-based compound such as difluoroethylene carbonate and the like; or pyridine, triethylphosphite, triethanolamine, cyclic ether, ethylenediamine, n-glyme, hexamphosphoric triamide, nitrobenzene derivatives, sulfur, quinone imine dyes, N-substituted oxazolidinones, N,N-substituted imidazolidines, ethylene glycol dialkyl ethers, ammonium salts, pyrrole, 2-methoxyethanol, aluminum trichloride or the like may be added to the electrolyte for the purpose of improving lifetime characteristics of the battery, suppressing a reduction in battery capacity, and improving discharge capacity of the battery. Here, the additive may be included in an amount of 0.1 wt % to 5 wt % based on the total weight of the electrolyte.

EXAMPLES

Hereinafter, the present invention will be described in detail with reference to examples. However, the following examples are intended to illustrate the present invention and are not intended to limit the present invention.

Example 1

A negative electrode active material slurry was prepared by adding 92 wt % of a negative electrode active material (graphite: SiO=7:3), 3 wt % of a conductive agent (Denka black), 3.5 wt % of a binder (SBR) and 1.5 wt % of a thickener (CMC) to water. One surface of a copper current collector was coated with the prepared negative electrode active material slurry, and dried and pressed to form a negative electrode active material layer on a negative electrode current collector.

A lithium metal sheet having a thickness of 40 μm was cut to a width of 3 mm and attached at intervals of 5 mm on a releasable PET film. The PET film on which a lithium metal pattern was formed by attaching a lithium metal sheet was put on the negative electrode active material layer so that the lithium metal pattern was brought into contact with the negative electrode active material layer, and pressed with a linear pressure of 5 kN/cm through a roll press. After compression, the PET film was peeled off, and a negative electrode loaded with a lithium metal pattern was obtained.

A pre-lithiation solution was prepared by dissolving $1M\text{-}LiPF_6$ in a solvent in which ethylene carbonate (EC) and diethyl carbonate (DEC) were mixed in a volume ratio of 50:50, and the negative electrode loaded with the lithium metal foil prepared above was impregnated with this solution at a temperature of 25° C. for 24 hours. During impregnation, the lithium metal was ionized and diffused into the negative electrode active material layer. After 24 hours, all the lithium metal was ionized and diffused into the negative electrode active material layer of the negative electrode, leaving an empty space (concave portion) in the shape of a valley at a place where an original lithium metal had once been. The depth of generated concave portion was about 30 μm and the width thereof was about 3.5 mm. The negative electrode having the electrode valleys thus formed was taken out of the pre-lithiation solution, washed with DMC and dried to prepare a pre-lithiated negative electrode.

Example 2

A pre-lithiated negative electrode was produced in the same manner as in Example 1 except that the linear pressure of roll pressing was 1 kN/cm. The concave portion generated in the negative electrode had a depth of about 25 μm and a width of about 3.3 mm.

Comparative Example 1

A pre-lithiated negative electrode was produced in the same manner as in Example 1 except that the lithium metal sheet was placed on a front surface instead of attaching the lithium metal sheet in a line-shaped pattern on the releasable PET film. In the case of the negative electrode of Comparative Example 1, since the lithium metal sheet which was not formed in a line-shaped pattern in the production process was used, concave portions were not formed in the negative electrode active material layer.

Comparative Example 2

A pre-lithiated negative electrode was produced in the same manner as in Example 1 except that a process of pressing using a roll press was not performed. In the case of the negative electrode of Comparative Example 2, since a pressing process was not performed in the production process, concave portions were not formed in the negative electrode active material layer.

Comparative Example 3

A pre-lithiated negative electrode was produced in the same manner as in Example 1 except that a lithium metal foil having a thickness of 40 μm was cut to a width of 3 mm and directly attached at intervals of 5 mm on the negative electrode active material layer without using a releasable PET film, and a process of pressing using a roll press was not performed. In the case of the negative electrode of Comparative Example 3, since a pressing process was not performed in the production process, concave portions were not formed in the negative electrode active material layer.

EXPERIMENTAL EXAMPLE

After interposing a polyolefin separator between the pre-lithiated negative electrode produced in the Examples and Comparative Examples and $LiCoO_2$ used as the positive electrode, an electrolyte solution in which 1M LiPF6 was dissolved in a solvent in which ethylene carbonate (EC) and diethyl carbonate (DEC) were mixed at a volume ratio of 50:50 was injected to produce coin-type half cells.

The batteries produced using the pre-lithiated negative electrode of Examples 1 to 2 and Comparative Examples 1 to 3 were charged and discharged using an electrochemical charging and discharging device. Here, batteries were charged up to a voltage of 4.2 V at a current density of 0.1 C-rate during charging, and discharged to a voltage of 2.5 V at the same current density during discharging. The initial efficiency (%) and the capacity retention rate (%) were calculated as follows after 100 cycles of charging and discharging, and the values are shown in the following Table 1.

Initial efficiency (%)=(discharge capacity of the first cycle/charge capacity of the first cycle)×100

Capacity retention rate (%)=(discharge capacity of the 100th cycles/discharge capacity of the first cycle)×100

TABLE 1

|  | Example 1 | Example 2 | Comparative Example 1 | Comparative Example 2 | Comparative Example 3 |
|---|---|---|---|---|---|
| Initial efficiency (%) | 87.3 | 85.4 | 75.3 | 73.8 | 76.7 |
| Capacity retention rate (%) | 88 | 87 | 77 | 75 | 77 |

It can be seen from Table 1 that the lithium secondary battery including the negative electrode produced in the Examples exhibits remarkably superior effects over the lithium secondary battery including the negative electrode of the Comparative Example in terms of the initial efficiency and capacity retention rate.

As a result, it can be seen that the secondary battery including the negative electrode of the present invention exhibits even more excellent effects even when all of the secondary batteries of the Examples and the Comparative Examples include pre-lithiated negative electrodes.

BRIEF DESCRIPTION OF REFERENCE NUMERALS

100: negative electrode current collector
110: negative electrode active material layer
120: negative electrode active material layer into which lithium metal ions are diffused
200: polymer release film
210: lithium metal pattern
220: concave portion
310: negative electrode loaded with lithium metal pattern
320: pre-lithiated negative electrode

The invention claimed is:

1. A method of producing a negative electrode for a lithium secondary, the method comprising:
   (a) applying a negative electrode active material layer on a surface of a negative electrode current collector;
   (b) forming a lithium metal pattern on a surface of a polymer release film;
   (c) disposing the lithium metal pattern on the negative electrode active material layer so that the lithium metal pattern formed on the polymer release film is in contact with the negative electrode active material layer to form a composite structure;
   (d) pressing the result of (c) composite structure;
   (e) removing the polymer release film from the result of (d) the lithium metal pattern of the pressed composite structure to produce a negative electrode loaded with the lithium metal pattern; and
   (f) pre-lithiating the negative electrode loaded with the lithium metal pattern by impregnating the negative electrode loaded with the lithium metal pattern with a pre-lithiation solution,
   wherein the lithium metal pattern is a line-and-space pattern, and
   wherein the line-and-space pattern has a pattern height: width: interval ratio of 0.01 to 0.1:1 to 5:2 to 8.

2. The method of claim 1, wherein the pressing is roll pressing at a linear pressure of 1 kN/cm to 10 kN/cm.

3. The method of claim 1, wherein lithium in the lithium metal pattern is ionized through pre-lithiation and diffused into the negative electrode active material layer.

4. The method of claim 3, wherein, in the negative electrode, lithium metal is ionized and diffused into the negative electrode active material layer, thereby forming a line-shaped concave portion in a place from which the lithium metal pattern was prior to being ionized and diffused.

5. The method of claim 1, wherein the pre-lithiation solution comprises an ionizable lithium salt and an organic solvent.

6. The method of claim 1, wherein the removing step comprises peeling the polymer release film from the result of (d) the lithium metal pattern of the pressed composite structure.

7. The method of claim 1, wherein the polymer release film comprises a peelable polyethylene terephthalate (PET) film.

* * * * *